Nov. 10, 1959  R. H. ALEXANDER  2,912,032
SPRING TIRE
Filed June 20, 1957
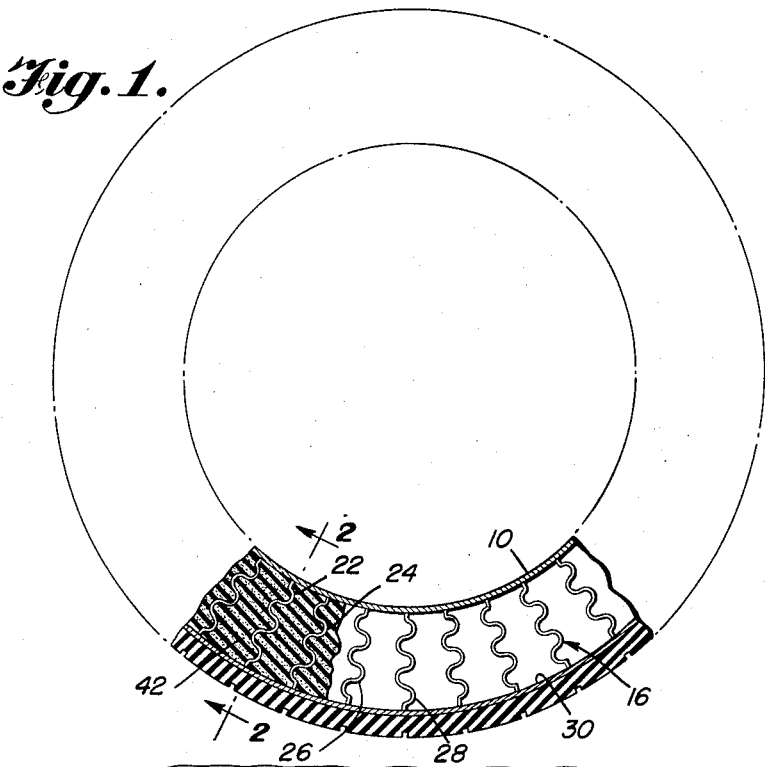
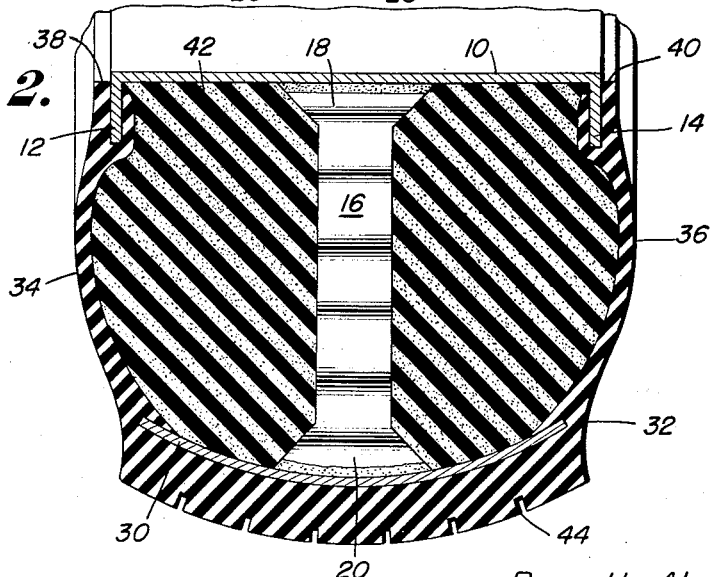
INVENTOR
Ray H. Alexander
BY Diggins & LeBlanc
ATTORNEYS United States Patent Office 2,912,032
Patented Nov. 10, 1959

2,912,032

SPRING TIRE

Ray H. Alexander, Holdrege, Nebr.

Application June 20, 1957, Serial No. 666,930

5 Claims. (Cl. 152—6)

This invention relates to improvements in resilient tires for vehicles and more specifically relates to a resilient non-pneumatic tire.

Practically since the advent of the pneumatic tire continuing attempts have been made to provide non-pneumatic substitutes utilizing springs of one type or another either with or without a rubber casing. In times of war and national emergencies these efforts have been spurred by a shortage of synthetic and natural rubber, while at other times tires of this type have been proposed in an effort to obtain improved vehicle tire performance, or to provide a tire suited for a specific need. While a large number of different varieties of this type of tire have been patented, none has ever received commercial acceptance to my knowledge. In many instances this is due to the fact that the so-called tire in reality amounted to a complete wheel which would have to be substituted for the present wheels on the vehicle. In other instances performance has been less than satisfactory and tire life less than that normally secured with pneumatic tires. In many cases the appearance of the tire is objectionable and in most cases no provision is made for effecting repairs without substantially complete replacement of the entire unit.

It is accordingly a primary object of the present invention to provide an improved resilient non-pneumatic tire.

It is another object of the invention to provide an improved resilient non-pneumatic tire which may be mounted on wheel rims in much the same manner as present pneumatic tires.

It is another object of the invention to provide an improved resilient non-pneumatic tire which is relatively low in cost and which has a long life.

It is another object of the invention to provide an improved resilient non-pneumatic tire which may be easily repaired and which may be recapped in the manner of pneumatic tires.

It is a further object of the invention to provide a resilient non-pneumatic tire having substantially the same appearance as current pneumatic tires and which transmits less road shock to the vehicle upon which the tires are mounted.

These and further objects and advantages of the invention will become more apparent upon reference to the following specification and claims and the appended drawings wherein:

Figure 1 is a vertical section of a non-pneumatic tire constructed according to the present invention; and Figure 2 is a partial vertical cross-section of the non-pneumatic tire of Figure 1 taken along the line 2—2.

Referring to the figures of the drawing, the non-pneumatic resilient tire of my invention consists of a solid steel inner rim 10 having outwardly directed flanges 12 and 14 at the edges thereof. Attached to this rim are a series of strap springs 16 having an undulated or generally sinusoidal cross section. Each spring is provided with an increased width inner end 18 and an increased width outer end 20, as shown in Figure 2. The edge of the increased width inner end 18 is welded to the rim 10, with the increased width providing increased strength in the connection between the rim and the spring.

It will be noted that the springs 16 are mounted upon the rim in pairs with respect to the direction of the undulations therein. That is to say, a pair of springs 22 and 24 having undulations directed in the same direction are placed adjacent a pair of springs 26 and 28 having undulations directed in the opposite direction. This construction has been found to produce a more uniform resiliency regardless of the direction of rotation of the wheel upon which the tire is placed.

Welded to the outer widened ends of the springs 16 is a concave-convex flexible steel outer rim 30 having its concave side facing inwardly.

A casing 32 is fused and vulcanized about the outer rim 30 and has side walls 34 and 36 terminating in grooved edges 38 and 40. These edges are vulcanized to the flanges 12 and 14 on the inner rim 10. The interior of the casing 32 is filled with a suitable resilient filling 42 which may be of foam rubber. A suitable tread 44 may be provided on the outer face of the casing 32 in a conventional manner. The springs 16 are preferably of the type which provide equal restoring force for equal amounts of compression and expansion.

In operation the tire is mounted upon the rim of a wheel on a vehicle and has an appearance practically the same as that of conventional pneumatic tires, the sponge rubber filler 42 insuring conventional tire shape. When weight is placed upon the tire the springs 16 nearest the road contract while the remaining springs expand to take up some of the stress which would otherwise be placed upon the springs subjected to compression. The flexibility of the outer rim minimizes road shock while the concave-convex shape of this rim enables the rim to transmit some tension to the springs in the upper half of the tire. By this expedient it is possible to take advantage of the desirable features of spring tires utilizing rigid outer rims and also to simultaneously take advantage of the desirable features of completely flexible rims, without incurring the disadvantages normally associated with each of these types of tires. After the tread of the tire has become worn it may be removed in the manner of a conventional pneumatic tire and recapped according to standard procedures. Should one of the springs in the tire break it is a simple matter to cut a hole in the casing adjacent this spring to permit removal of the foam rubber filling and replacement of the spring. The cut in the casing can then be vulcanized closed and the tire returned to its original condition with a minimum of expense and effort. The thickness of the material of which the inner and outer rims and springs are constructed may be varied in accordance with the weight of the load which the tire is to carry and any desired types of treads may be provided, such as anti-skid treads or snow treads.

My structure is simple and inexpensive and permits bending and flexing of the tire over the loaded area in a manner similar to that encountered with pneumatic tires. Less road shock is transmitted, however, and there is no possibility of damage to the casing as when a pneumatic tire is punctured.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A resilient non-pneumatic tire comprising an inner rim having outwardly extending flanges at its edges, a continuous flexible outer metallic rim having a concave-convex cross section with the concave surface facing inwardly, undulated strap springs secured to said inner and outer rims and extending generally radially therebetween with the broad surfaces of said strap springs transverse to the circumferential length of each of said rims, a casing vulcanized about said outer rim and having the edges of its side walls vulcanized to said flanges on said inner rim, and a resilient filler substantially filling the space within said casing.

2. A tire as set out in claim 1 wherein said springs have ends wider than the central portions thereof, said ends being welded to said rims.

3. A tire as set out in claim 2 wherein the undulations in adjacent groups of springs extend in opposite directions.

4. A tire as set out in claim 1 wherein said edges of said side walls have a groove therein in which said flanges are received.

5. A tire as set out in claim 3 wherein said filler is foam rubber.

References Cited in the file of this patent

UNITED STATES PATENTS

| | | |
|---|---|---|
| 1,457,013 | Wilson | May 29, 1923 |
| 1,510,709 | Shoemaker | Oct. 7, 1924 |
| 1,587,439 | Talos | June 1, 1926 |
| 1,948,412 | Bennett | Feb. 20, 1934 |
| 2,678,675 | Crowder | May 18, 1954 |
| 2,836,982 | Voss et al. | June 3, 1958 |

FOREIGN PATENTS

| | | |
|---|---|---|
| 743,195 | Great Britain | Jan. 11, 1956 |